United States Patent
Joern et al.

(10) Patent No.: US 9,637,215 B2
(45) Date of Patent: May 2, 2017

(54) PRESSURE BULKHEAD FOR AN AIRCRAFT AND DEVICE AS WELL AS METHOD FOR MANUFACTURING AN AIRCRAFT STRUCTURAL COMPONENT

(71) Applicant: Airbus Operations GmbH, Hamburg (DE)

(72) Inventors: Paul Joern, Hamburg (DE); Karim Grase, Hamburg (DE); Ichwan Zuardy, Hamburg (DE); Alexei Vichniakov, Hamburg (DE); Bernd Schwing, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 1 day.

(21) Appl. No.: 14/551,634

(22) Filed: Nov. 24, 2014

(65) Prior Publication Data

US 2015/0144736 A1    May 28, 2015

(30) Foreign Application Priority Data

Nov. 27, 2013   (DE) ........................ 10 2013 224 233

(51) Int. Cl.
*B64C 1/10*    (2006.01)
*B64C 1/06*    (2006.01)
(Continued)

(52) U.S. Cl.
CPC .............. *B64C 1/10* (2013.01); *B29C 70/443* (2013.01); *B29C 70/865* (2013.01);
(Continued)

(58) Field of Classification Search
CPC .... B64C 1/10; B64C 1/064; B64C 2001/0072
See application file for complete search history.

(56) References Cited

U.S. PATENT DOCUMENTS

| 5,062,258 A | 11/1991 | Samejima et al. |
| 5,062,589 A | 11/1991 | Roth et al. |
| (Continued) | | |

FOREIGN PATENT DOCUMENTS

| DE | 3906170 | 8/1990 |
| DE | 60029963 | 2/2007 |
| (Continued) | | |

OTHER PUBLICATIONS

German Office Action, Nov. 27, 2013.

*Primary Examiner* — Tien Dinh
*Assistant Examiner* — Richard R Green
(74) *Attorney, Agent, or Firm* — Greer, Burns & Crain, Ltd.

(57) ABSTRACT

A pressure bulkhead made of fiber composite material for an aircraft fuselage for the pressure-tight axial closure of a fuselage region configured to be put under internal pressure. The bulkhead comprises a first area element, at least one second area element and a plurality of core elements. The first area element has a plurality of receptacles. Each receptacle is configured to receive a core element. The core elements are received in the receptacles between surfaces facing one another of the first area element and of the at least one second area element. The surfaces facing one another of the first area element and of the at least one second area element are connected to one another in regions without core elements.

4 Claims, 3 Drawing Sheets

(51) Int. Cl.
  *B32B 37/00* (2006.01)
  *B29C 70/44* (2006.01)
  *B29C 70/86* (2006.01)
  *B64C 1/00* (2006.01)

(52) U.S. Cl.
  CPC .......... *B32B 37/0038* (2013.01); *B64C 1/064* (2013.01); *B32B 2260/00* (2013.01); *B64C 2001/0072* (2013.01); *Y02T 50/433* (2013.01)

(56) References Cited

U.S. PATENT DOCUMENTS

| | | | |
|---|---|---|---|
| 5,899,412 A | 5/1999 | Dilorio et al. | |
| 6,013,213 A * | 1/2000 | Lewit | B29C 44/1209 |
| | | | 264/257 |
| 6,213,426 B1 | 4/2001 | Weber et al. | |
| 6,378,805 B1 | 4/2002 | Stephan et al. | |
| 8,758,879 B2 * | 6/2014 | Pearson | B64C 1/10 |
| | | | 156/212 |
| 9,180,960 B2 * | 11/2015 | Rosman | B64C 1/065 |
| 9,199,713 B2 * | 12/2015 | Thomas | B64C 1/10 |
| 9,284,035 B2 * | 3/2016 | Victorazzo | B64C 1/064 |
| 2009/0137196 A1 | 5/2009 | Klug et al. | |
| 2010/0139857 A1* | 6/2010 | Pham | B29C 33/485 |
| | | | 156/286 |
| 2011/0179626 A1 | 7/2011 | Weber | |
| 2011/0290940 A1 | 12/2011 | Noebel et al. | |
| 2012/0228427 A1 | 9/2012 | Sayilgan et al. | |
| 2013/0234373 A1 | 9/2013 | Zuardy et al. | |

FOREIGN PATENT DOCUMENTS

| | | | |
|---|---|---|---|
| DE | 102007054101 | 5/2009 | |
| DE | 102008040213 | 1/2010 | |
| DE | 102009049007 | 4/2011 | |
| DE | 102010018933 | 11/2011 | |
| DE | 102010035493 | 3/2012 | |
| FR | WO 2009056729 | * 5/2009 | ............... B64C 1/10 |

\* cited by examiner

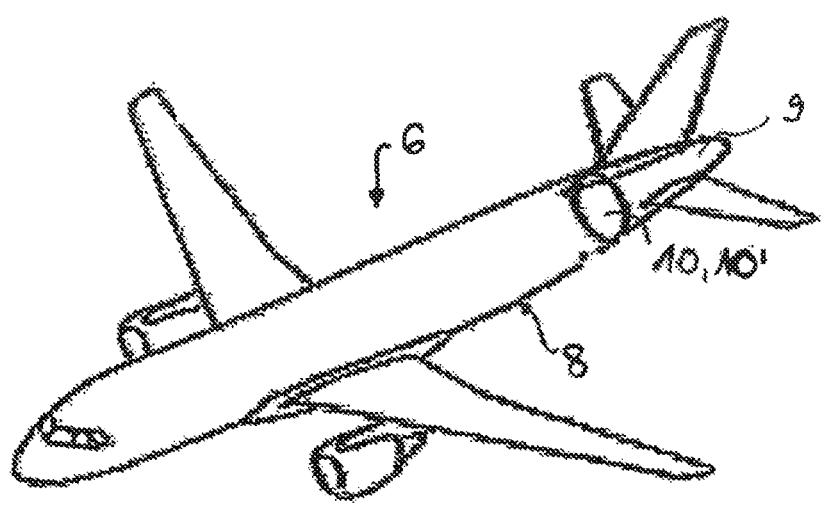
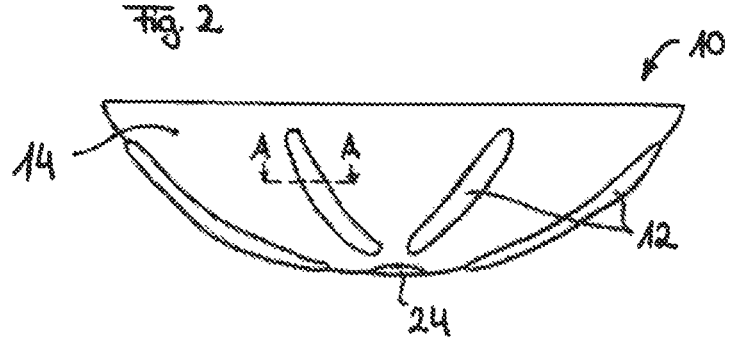

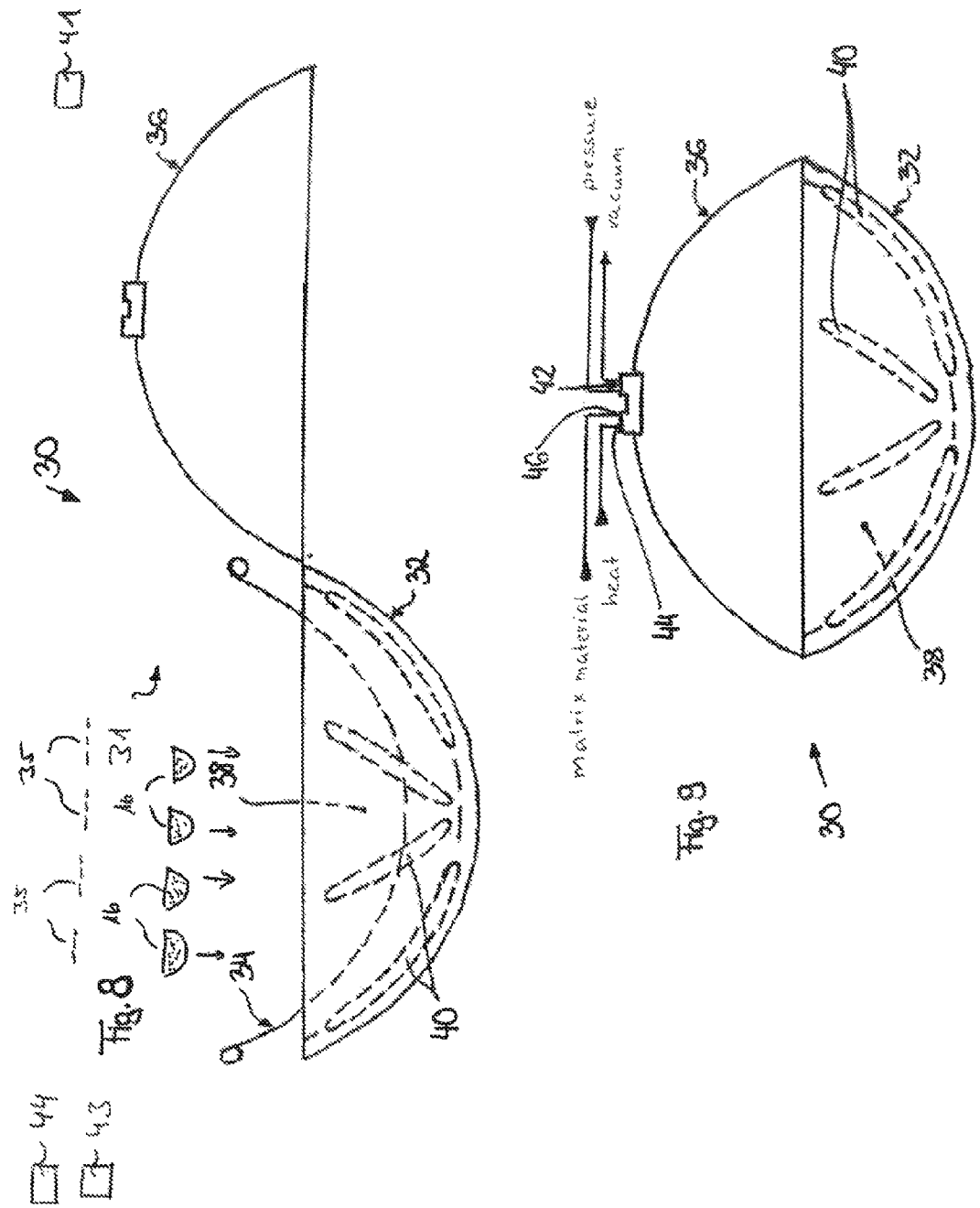

PRESSURE BULKHEAD FOR AN AIRCRAFT AND DEVICE AS WELL AS METHOD FOR MANUFACTURING AN AIRCRAFT STRUCTURAL COMPONENT

CROSS-REFERENCES TO RELATED APPLICATIONS

This application claims the benefit of the German patent application No. 10 2013 224 233.6 filed on Nov. 27, 2013, the entire disclosures of which are incorporated herein by way of reference.

BACKGROUND OF THE INVENTION

The invention relates to a pressure bulkhead of fiber composite material for an aircraft fuselage for the pressure-tight axial closure of a fuselage region configured to be put under internal pressure, as well as to a device and a method for manufacturing an aircraft structural component of fiber composite material, in particular for manufacturing a pressure bulkhead for an aircraft fuselage for the pressure-tight axial closure of a fuselage region configured to be put under internal pressure.

In modern commercial aircraft, a plurality of different structural components of fiber composite material is used. In particular, these components must have a structural rigidity and buckling stability that corresponds to their use. Thus it is now common among other things to form a pressure bulkhead for the pressure-tight axial closure of a region of the aircraft fuselage configured to be put under internal pressure as a fiber composite structural component. Such a pressure bulkhead comprises all the structural elements that are necessary for the pressure-tight closing of the region of the aircraft fuselage in question and for conducting the forces resulting from the internal pressure into the fuselage shell structure of the aircraft. The pressure bulkhead of fiber composite material may have a monolithic construction in the shape of a calotte. Areas of such a fiber composite pressure bulkhead that are particularly subjected to stress or loading in use may be formed reinforced, wherein such reinforcements in the form of further fiber composite layers may be applied to the pressure bulkhead component in the stressed areas, in order to increase their rigidity. Such a pressure bulkhead is known e.g., from DE 39 06 170 A1 and from U.S. Pat. No. 5,062,589 A (both incorporated by reference).

SUMMARY OF THE INVENTION

The invention is directed to an object of providing a pressure bulkhead of fiber composite material for an aircraft fuselage for the pressure-tight axial closure of a region of the fuselage configured to be put under internal pressure, which pressure bulkhead has a highly integrated structure as well as outstanding structural mechanical properties and can be manufactured efficiently. Other objects of the invention are the provision of a device facilitating an efficient manufacture of a highly integrated structure with outstanding structural mechanical properties as well as of a method for manufacturing an aircraft structural component of fiber composite material, in particular a pressure bulkhead.

A pressure bulkhead for an aircraft fuselage for the pressure-tight closure of a fuselage region configured to be put under internal pressure comprises a first area element, at least one second area element and a plurality of core elements, which are received between the first area element and the at least one second area element. The area elements may contain mats and/or woven fabrics made from fibers, but also single fibers in the form of short fibers or endless fibers. The area elements preferably contain multiaxial and unidirectional fiber mats, so-called "non-crimp fabrics" (NCF). The fibers may be e.g., carbon fibers. The area elements may comprise a plurality of such fiber woven fabrics or mats, which may be arranged both in a plane, thus adjacent to one another, and over one another in the direction of the thickness of the area element. Fiber layers arranged over one another are preferably arranged rotated axially in relation to one another by 90°. The arrangement of the fibers in the area elements may vary locally. For example, fiber layers arranged over one another may be provided in locally limited areas of the area elements, in order to meet the rigidity requirements of the pressure bulkhead, especially along load paths. The first area element preferably has dimensions that permit the installation of the pressure bulkhead at a desired point in the rear of an aircraft.

In addition to the reinforcing fibers, the first area element and the at least one second area element of the fiber composite pressure bulkhead comprise a matrix material. A curable synthetic material, for example a resin, in particular an epoxy resin, is preferably used as matrix material. The matrix of the area elements may be formed from the matrix material by curing of an impregnation applied to the surfaces of the reinforcing fibers and/or by introducing the matrix material in a liquid state into a mold into which the reinforcing fibers are inserted.

The first area element of the pressure bulkhead has a plurality of receptacles that are configured to receive a core element respectively. The core elements are thus received in these receptacles between surfaces facing one another of the first area element and of the at least one second area element. The receptacles in the first area element are preferably realized in the form of elongated recesses or grooves. The shape of the receptacles and the shape of the core elements are preferably matched to one another, so that the core elements can be positioned stably in the receptacles. The pressure bulkhead is thereby provided with stiffening struts, which are formed by the core elements arranged in the receptacles of the first area element and which significantly improve the structural mechanical properties of the pressure bulkhead. A cross section of these stiffening struts may vary in the longitudinal direction of the stiffening struts, in order to increase the stability of the component in the event of high pressure differences. In particular, the cross section of the stiffening struts may become smaller in the direction of a component center point. The core elements themselves may have pin-like stiffenings and/or may be formed or constructed in such a way that the development or continuation of cracks in the core elements is suppressed. In regions without core elements, the surfaces facing one another of the first area element and of the at least one second area element are connected to one another. The pressure bulkhead is distinguished by a highly integrated structure and thus a high strength and rigidity, in particular at negative pressures and in the case of a rapid drop in pressure. Furthermore, the pressure bulkhead has a low weight and is comparatively simple and thus cost-effective to manufacture.

In its regions without core elements, the fiber composite pressure bulkhead is preferably constructed monolithically, i.e., in the regions without core elements the fiber composite pressure bulkhead preferably comprises either exclusively the first area element or of the area elements connected to one another. Alternatively to this, an interface layer may be provided between the at least one second area element and the first area element in regions without core elements, in order to guarantee the connection of the area elements. Altogether the pressure bulkhead can thus be constructed in a sandwich-like manner at least in sections.

The shape of the receptacles formed in the first area element and the shape of the core elements are preferably selected so that the core elements can be received without play as far as possible in the receptacles of the first area element. Nevertheless, not all regions of a receptacle of the first area element can normally be filled by the core element. In particular, transition regions between regions of the first area element without core elements and receptacle regions of the first area element, meaning exit regions of the receptacles, are mostly not filled by the material of taken-up core elements. Such regions of a receptacle of the first area element, thus in particular its exit regions, may be filled by matrix material in the fiber composite pressure bulkhead. Alternatively to this, it is also conceivable that the core elements are provided with a sheathing, which is configured to fill the previously described transition regions following insertion of the core elements into the receptacles of the first area element. Such a sheathing may be, e.g., an interface layer surrounding the core element, which promotes or supports a connection between the core element and the receptacle of the first area element as well as the second area element covering the receptacle. It is also conceivable, however, that an interface layer at least partially surrounding the core element is provided separately from a sheathing.

An interface layer to support the connection between the core elements and the first and/or the second area element does not necessarily have to be a component of the core element, but may be inlaid or introduced into a receptacle even before the introduction of a core element into the receptacle. A resin layer, in particular an epoxy resin layer or an epoxy amine resin layer, may be used as an interface layer for the connection between core and area elements. Such an interface layer may also be used to support the connection between the first and the at least one second area element.

The shape of the pressure bulkhead is substantially determined by the first area element, wherein the first area element is preferably formed in the shape of a calotte. The receptacles formed in the first area element may run in a radial direction of the calotte-shaped first area element. Furthermore, the receptacles may extend in the direction of the concave and/or convex side of the calotte shape, i.e., be curved in the direction of the concave and/or convex side of the calotte shape. In the case of a pressure bulkhead built into an aircraft fuselage, the receptacles may thus extend in the direction of the region of the fuselage configured to be put under internal pressure and/or in the direction of the unpressurised rear region of the aircraft.

The pressure bulkhead may comprise only one second area element, which is then formed preferably likewise in the shape of a calotte. Alternatively to this, however, a plurality of second area elements may also be provided, the shape of which may be adapted to the shape of the receptacles formed in the first area element in such a way that the second area elements are suitable to cover the core elements arranged in the receptacles of the first area element and to be connected to the first area element in the regions of the first area element surrounding the receptacles. The pressure bulkhead can then be designed to be especially lightweight.

The core elements to be received in the receptacles of the first area element are preferably formed from a foam material. For example, a polymethacrylimide foam, which may be formed as closed-cell foam, may be used to manufacture the core elements. Core elements comprising a foam material advantageously improve the strength and rigidity of the pressure bulkhead without excessively increasing the weight of the component.

The fiber composite pressure bulkhead may be provided in particularly stressed regions, such as e.g., the edge regions for attachment to the aircraft fuselage, or in regions in which openings are to be provided to lead supply lines through, with reinforcements (thickenings), e.g., by inlaying further fiber layers. These particularly stressed regions may also be load paths of the pressure bulkhead used in the aircraft fuselage.

A device for manufacturing an aircraft structural component from fiber composite material, in particular for manufacturing a pressure bulkhead for an aircraft fuselage for the pressure-tight closure of a region of the fuselage configured to be put under internal pressure, such as e.g., that previously described, comprises a closable tool with a receiving device for receiving a semifinished arrangement provided for manufacturing a fiber composite component, such as a pressure bulkhead, for example, as well as a cover device for the pressure-tight covering of the receiving device. The semifinished arrangement may be a semifinished arrangement, for example, that is suitable for manufacturing the first area element of the pressure bulkhead described above and may comprise impregnated reinforcement fibers if applicable, which are preferably present in the form of a fiber mat or woven fabric, in order to give the semifinished arrangement a certain dimensional stability. The semifinished arrangement may comprise only one fiber layer or several fiber layers arranged adjacent to one another and/or above one another.

In the closed state of the tool, the receiving device and the cover device enclose a tool cavity. A pressurizing device serves to pressurize the tool cavity. The device further comprises a matrix material supply device for supplying matrix material to the tool cavity and for introducing the matrix material into the semifinished arrangement received in the receiving device of the tool. The matrix material, for example a curable synthetic material, preferably a resin, in particular an epoxy resin, is supplied to the tool cavity preferably in a liquid state.

The receiving device of the tool has a surface structure with a plurality of receptacles, which structure is configured to act on the semifinished arrangement upon pressurization of the tool cavity in such a way that the semifinished arrangement is provided with a surface structure with a plurality of receptacles that corresponds to the surface structure of the receiving device. The receptacles produced in the surface of the semifinished arrangement are configured to receive a core element, which core element may comprise a foam material as described above, for example. Such receptacles have already been described in greater detail above with reference to a fiber composite pressure bulkhead. The features described previously in relation to the pressure bulkhead, for example of the receptacles and the core elements, but also of all other elements and aspects, should apply by analogy to the aircraft structural component that can be manufactured by means of the device in general. The device for manufacturing an aircraft structural component from fiber composite material permits efficient manufacturing of a component, in particular of a pressure bulkhead, which is distinguished by outstanding mechanical properties on account of its integrated stiffening structure.

The receiving device of the tool may also be configured to receive a plurality of core elements, which are arranged in the receptacles produced in the semifinished arrangement. The tool can then be opened, for example, following the molding of the surface structure of the semifinished arrangement received in the receiving device of the tool, in order to insert the core elements into the receptacles formed in the semifinished arrangement.

Furthermore, the receiving device of the tool may be configured to receive at least one further semifinished arrangement. The further semifinished arrangement may be a semifinished arrangement, for example, which is suitable for manufacturing the at least one second area element of the pressure bulkhead described above and if applicable comprises impregnated reinforcement fibers, which are present preferably in the form of a fiber mat or woven fabric, in order to give the further semifinished arrangement a certain dimensional stability already. The further semifinished arrangement may comprise only one fiber layer or several fiber layers arranged adjacent to one another and/or above one another.

The receiving device of the tool may be configured to permit take-up of the further semifinished arrangement in a position in which the further semifinished arrangement is applied to the semifinished arrangement receiving the core elements in such a way that the core elements in the receptacles of the semifinished arrangement are received between surfaces facing one another of the semifinished arrangement and of the at least one further semifinished arrangement, and the surfaces facing one another of the semifinished arrangement and of the at least one further semifinished arrangement may be connected to one another in regions without core elements. Several semifinished arrangements can thereby be processed at the same time by means of the device, i.e., impregnated with matrix material, for example, and subjected to a curing process to cure the matrix material.

The tool cavity may be configured to play-free receive the semifinished arrangement, the plurality of core elements and/or the at least one further semifinished arrangement. However, the tool cavity is preferably configured to play-free receive the semifinished arrangement, the plurality of core elements and/or of the at least one further semifinished arrangement as well as of flow media and a film arrangement surrounding the flow media. The film arrangement may comprise a semi-permeable material, i.e., a material that is gas-permeable, but impermeable to the matrix material. In addition or alternatively to this, however, the film arrangement may also comprise a gas-tight material or a layer of a gas-tight material. This is advantageous in particular if a vacuum is to be produced in a space limited by the film arrangement during the supply of matrix material to the semifinished arrangement and/or the at least one further semifinished arrangement and/or during curing of the matrix material.

The film arrangement may substantially completely encase or only partially surround the semifinished arrangement, the core elements and/or the at least one further semifinished arrangement. It is also advantageous if the film arrangement is highly flexible, in order to permit an adaptation of the surface structure of the semifinished arrangement to the surface structure of the receiving device of the tool. Furthermore, a shell, in particular of metal, may be provided that acts upon the film arrangement and thus on the matrix semifinished arrangement received in the film arrangement, in order to improve the surface properties of the composite component to be manufactured in a region of a surface that the open or covered side of the receptacles faces.

The pressurizing device may be configured apply an over- or under pressure, i.e., a pressure that is above or below the atmospheric pressure in the environment of the tool, to the tool cavity and/or a space limited by the film arrangement. If the tool cavity is applied with excess pressure, a semifinished arrangement taken up in the receiving device can be pressed into the receiving device. The pressurizing device of the device is preferably designed to apply an excess pressure of up to 7 bar, which can be supplied by a house pressure line, to the tool cavity.

If the tool cavity is put under negative pressure before the matrix material is supplied to it, the matrix material supplied penetrates the semifinished arrangement "as if of itself" on account of the prevailing negative pressure and impregnates it. Furthermore, the negative pressure helps to keep the semifinished arrangement in position in the receiving device. The negative pressure in the tool cavity may be maintained even during a subsequent curing step, in order to ensure that gases enclosed in the matrix material are removed from the matrix material and a pore-free matrix is obtained. Alternatively to this, however, the matrix material may also be injected into the semifinished arrangement by an excess pressure in the tool cavity, in order to promote the impregnation of the semifinished arrangement received in the receiving device of the tool. This excess pressure of 3 bar, for example, may also be maintained during a subsequent curing step.

It is especially preferable if the introduction of the matrix material takes place while the volume is kept constant, i.e., the finished aircraft structural component has approximately the same volume as the semifinished arrangement used to manufacture the aircraft component or as a combination of a semifinished arrangement with a plurality of core elements and/or a further semifinished arrangement used to manufacture the aircraft component. A component manufactured while the volume is kept constant has in particular minimal inherent stresses, especially in the core of a sandwich construction region. The formation and continuation of cracks in the sandwich core are inhibited thereby. Details of the manufacture of a fiber composite structural component according to a "constant volume method" are described in the documents DE 10 2010 035 493 A1 and US 2013/234373 A1 (both incorporated herein by reference) and can be transferred to the device described here and the method described here.

Finally, the device may also comprise a heating device for heating the semifinished arrangement and/or the at least one further semifinished arrangement to a temperature suitable for introducing the matrix material into the semifinished arrangement and/or the further semifinished arrangement. The heating device may be configured to heat only the semifinished arrangement and/or the at least one further semifinished arrangement. Alternatively to this, however, the heating device may be configured also to heat the entire tool cavity. Furthermore, the heating device may be configured to heat the semifinished arrangement and/or the at least one further semifinished arrangement or the entire tool cavity to a temperature at which the matrix material supplied to the semifinished arrangement and/or the further semifinished arrangement and/or an impregnation material applied to the fibers of the semifinished arrangement and/or the further semifinished arrangement cures or cure due to the heat supply. For example, the heating device may be configured to heat the semifinished arrangement and/or the at least one further semifinished arrangement or the entire tool cavity to a temperature of up to 200° C.

In a method for manufacturing an aircraft structural component from fiber composite material, in particular a pressure bulkhead for an aircraft fuselage for the pressure-tight axial closure of a fuselage region configured to be put under internal pressure, a semifinished arrangement provided for the manufacture of the aircraft structural component is first placed into an open tool, which has a receiving device for receiving the semifinished arrangement as well as a cover device for the pressure-tight covering of the receiving device. The semifinished arrangement may be formed as described above in connection with the device for manufacturing an aircraft structural component from fiber composite material and may comprise only one fiber layer or several fiber layers arranged adjacent to one another and/or above one another. Other features and aspects of the invention described above in connection with the device for manufacturing an aircraft structural component from fiber composite material are likewise transferable to the method for manufacturing an aircraft structural component from fiber composite material. In the closed state, the receiving device and the cover device enclose a tool cavity.

Following insertion of the semifinished arrangement, the tool is closed. Pressurization of the tool cavity then takes place, so that a surface structure of the receiving device of the tool, which structure has a plurality of receptacles, acts on the semifinished arrangement in such a way that the semifinished arrangement is provided with a surface structure corresponding to the surface structure of the receiving device, with a plurality of receptacles that are configured to receive a core element. Due to the pressurization of the tool cavity, the semifinished arrangement is pressed into the surface structure of the receiving device or applied to it.

In the next step, a negative or excess pressure is produced in the tool cavity, which is suitable for introducing the matrix material into the semifinished arrangement. Then matrix material is supplied to the tool cavity and this is introduced into the semifinished arrangement. Details of the introduction of the matrix material into the semifinished arrangement under negative or excess pressure were explained in greater detail above in connection with the device for manufacturing an aircraft structural component from fiber composite material.

The matrix material introduced into the semifinished arrangement is then cured. The curing process takes place preferably at 180° C. Following the curing of the matrix material, the fiber composite component, preferably after it has been cooled to roughly room temperature, is removed from the tool. In the method described here for manufacturing an aircraft structural component from fiber composite material, all method steps can be carried out in a single tool. The method can therefore be executed in an especially efficient, time-saving and thus cost-effective manner.

In another particularly preferred step in the method, a core element may be introduced into each of the receptacles introduced into the semifinished arrangement.

Following the introduction or insertion of the core elements into the receptacles formed in the semifinished arrangement, at least one further semifinished arrangement may be placed into the receiving device of the tool. The further semifinished arrangement may be formed as described above in connection with the device for manufacturing an aircraft structural component and may comprise only one fiber layer or several fiber layers arranged adjacent to one another and/or above one another. In particular, the further semifinished arrangement is applied to the semifinished arrangement receiving the core elements in such a way that the core elements are received in the receptacles of the semifinished arrangement between surfaces facing one another of the semifinished arrangement and the at least one further semifinished arrangement, and the surfaces facing one another of the semifinished arrangement and the at least one further semifinished arrangement are connected to one another in regions without core elements.

Following the pressurization of the tool cavity to produce the surface structure of the semifinished arrangement and prior to the introduction of the matrix material into the tool cavity, the tool may be opened, in order to insert at least one further fiber layer into the tool, i.e., the receiving device of the tool. Then the tool may be closed again and the tool cavity, as described above, may be pressurized, whereby the fiber layer newly placed into the receiving device of the tool is provided with the desired surface structure. These steps, in which at least one further fiber layer is inserted and pressed into the desired shape, in order thus to add to the semifinished arrangement, may be repeated until the semifinished arrangement taken up in the tool cavity has a desired thickness. The additional fiber layers may extend over the entire area of the semifinished arrangement. However, it is also conceivable to provide the semifinished arrangement locally with additional fiber layers, for example to produce locally reinforced regions.

If a further semifinished arrangement is placed into the receiving device of the tool, at least one additional fiber layer may also be laid onto the further semifinished arrangement before the introduction of a matrix material into the tool cavity, until the further semifinished arrangement has a desired thickness. The additional fiber layers may extend over the entire area of the further semifinished arrangement. However, it is also conceivable to provide the further semifinished arrangement locally with additional fiber layers, for example to produce locally reinforced regions.

The semifinished arrangement and/or the at least one further semifinished arrangement or the entire tool cavity are preferably heated before the supply of matrix material to the tool cavity to a temperature suitable for the introduction of the matrix material into the semifinished arrangement and/or the at least one further semifinished arrangement. Furthermore, the semifinished arrangement and/or the at least one further semifinished arrangement or the entire tool cavity may be heated following the supply of matrix material to the tool cavity to a temperature at which the matrix material supplied to the semifinished arrangement and/or to the further semifinished arrangement and/or an impregnation material applied to the fibers of the semifinished arrangement and/or of the further semifinished arrangement cures/cure due to the supply of heat.

Right at the beginning of the method, before the semifinished arrangement is placed into the tool, the receiving device is advantageously treated with a release agent or provided with a release layer, which then makes the separation or removal of the fiber composite component from the tool easier following the completion of the fiber composite component.

Furthermore, the semifinished arrangement and/or the at least one further semifinished arrangement or the entire tool cavity may be cooled to below room temperature, for example −50° C., before the supply of matrix material to the tool cavity. Moreover, the supply of matrix material to the tool cavity or the semifinished arrangement and/or the at least one further semifinished arrangement may be controlled in such a way that the volume of the finished component corresponds to the volume of the semifinished arrangement and, if present, the core elements and the at least one further semifinished arrangement at this low temperature. In this way it is achieved that the neutral position of the residual tension in the material of the component, in particular in the core elements, lies in a negative temperature range, to which the fiber composite component is exposed in ultimate deployment in an aircraft in flight operation of the aircraft. The starting temperature at which the volume is kept constant is preferably coordinated for each component to be manufactured to the ultimate purpose.

BRIEF DESCRIPTION OF THE DRAWINGS

Preferred embodiments of the invention are now explained in greater detail with reference to the enclosed schematic drawings, of which:

FIG. 1 shows an aircraft with a pressure bulkhead built in in the rear region of the fuselage, FIG. 2 shows a pressure bulkhead according to the invention in a first embodiment, FIG. 8 shows a device for manufacturing a pressure bulkhead from FIG. 2 with a tool in an open position and FIG. 9 shows the device from FIG. 8 with the tool in a closed position and with various connections.

DETAILED DESCRIPTION OF THE PREFERRED EMBODIMENTS

Figure 3:
FIG. 3 shows a cross section through a receptacle formed in a first area element of the pressure bulkhead from FIG. 2.

As is evident from FIG. 1, a pressure bulkhead 10, 10' is built into an aircraft fuselage 6, in order to seal off axially a fuselage region 8 that can be put under internal pressure from an unpressurised fuselage region 9 in the rear of the aircraft.

A first embodiment of such a pressure bulkhead 10 is shown in FIG. 2. The pressure bulkhead 10 has a first area element 14 formed substantially in the shape of a calotte. The first area element 14 comprises a fiber composite material and contains carbon fibers in the form of a fiber mat as well as a matrix material, for example a curable synthetic material, in particular an epoxy resin. Formed in the first area element 14 is a plurality of receptacles 12, which are curved in the direction of the convex side 14 of the pressure bulkhead 10. The receptacles 12 are accessible from the concave side (not visible in the figure) of the pressure bulkhead 10.

FIG. 3 shows a cross section through a receptacle 12 formed in the first area element 14. The receptacle 12 shown in FIG. 3 in cross section forms a stiffening structure for stiffening the first area element 14 and is also configured to receive a core element 16, the shape/form of which is adapted to the shape/form of the receptacle 12, in order to fill this. The core element 16 comprises a foam material. The receptacles 12 formed in the first area element 14 extend in a radial direction (see FIG. 2) and thus form, together with the core elements 16, a stiffening structure in the form of radial longitudinal struts.

Figure 4:
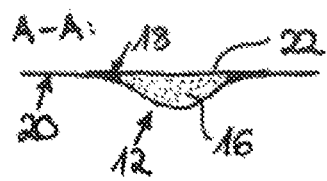
FIG. 4 shows a cross section through a receptacle formed in a first area element of the pressure bulkhead from FIG. 2 and filled with a core element.

A receptacle 12 filled with a core element 16 is shown in cross section in FIG. 4. As is evident from FIG. 4, the core element 16 is received substantially play-free in the receptacle 12. Transition regions 18 between lateral limitations of the core element 16 and lateral outlets of the receptacle 12 into regions 20 of the pressure bulkhead 10 without core elements are filled with a filler material. This filler material may be a sheathing of the core element 16, for example, or a material introduced separately into the transition regions 18. In particular, the transition regions 18 may be filled with a material that is contained also in the first area element 14 as matrix material.

The pressure bulkhead 10 also comprises a plurality of second area elements 22, which, like the first area element 14, comprise a fiber composite material and contain carbon fibers in the form of a fiber mat as well as a matrix material, for example a curable synthetic material, in particular an epoxy resin. The number of second area elements 22 of the pressure bulkhead 10 corresponds to the number of receptacles 12 formed in the first area element 14, so that each receptacle 12 or each core element 16 inserted into the receptacles 12 is covered by a second area element 22. Each core element 16 is thus taken up in a receptacle 12 between surfaces facing one another of the first area element 14 and a second area element 22. The first area element 12 and the second area elements 22 are connected to one another respectively in regions 20 of the pressure bulkhead 10 without core elements adjacent to the receptacles 12.

Figure 5:
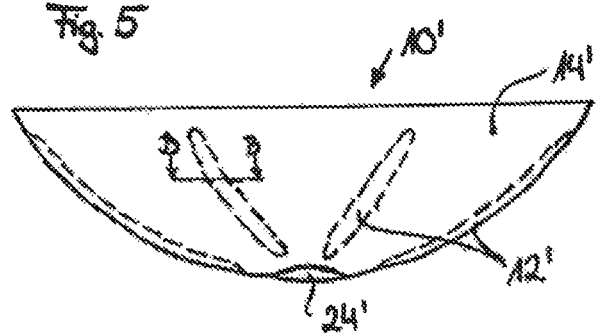
FIG. 5 shows a pressure bulkhead according to the invention in a second embodiment.

As is to be understood from FIGS. 2 and 5, the pressure bulkhead 10 also has an opening 24 in the center of the calotte shape, which opening can serve as an opening for leading supply lines through, when the pressure bulkhead 10 is built in in an aircraft fuselage 6, as illustrated in FIG. 1.

Figure 6:
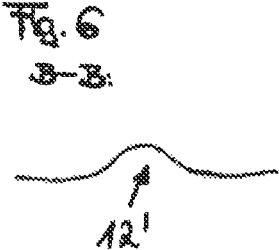
FIG. 6 shows a cross section through a receptacle formed in a first area element of the pressure bulkhead from FIG. 5.
Figure 7:
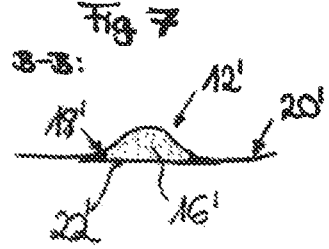
FIG. 7 shows a cross section through a receptacle formed in a first area element of the pressure bulkhead from FIG. 5 and filled with a core element.

FIG. 5 shows a second embodiment of a pressure bulkhead 10' in which receptacles 12' formed in a first area element 14' extend in the direction of the concave side (not visible in the figure) of the pressure bulkhead 10'. The receptacles 12' are consequently accessible from the convex side 14' of the pressure bulkhead 10'. FIG. 6 shows a cross section through a receptacle 12' formed in the first area element 14', which receptacle is configured to receive a core element 16'. A receptacle 12' filled with a core element 16' is shown in FIG. 7 in cross section. Otherwise the structure of the pressure bulkhead 10' according to FIGS. 5 to 7 corresponds to the structure of the pressure bulkhead 10 according to FIGS. 2 to 4.

FIG. 8 shows a device 30 for manufacturing a pressure bulkhead 10 according to FIG. 2. The device 30 comprises a closable tool 31 with a receiving device 32, which is suitable for receiving a semifinished arrangement 34 provided for the manufacture of the pressure bulkhead 10, as well as a cover device 36 for the pressure-tight covering of the receiving device 32. In the closed state of the tool, the receiving device 32 and the cover device 36 enclose a tool cavity 38. The semifinished arrangement 34 is a semifinished arrangement that is suitable for the manufacture of the first area element 14 of the pressure bulkhead 10 and comprises carbon fibers in the form of a fiber mat or woven fabric. The semifinished arrangement 34 may comprise only one fiber layer or several fiber layers arranged adjacent to and/or above one another, wherein two fiber layers arranged above one another preferably always have axial orientations offset by 90° to one another.

The semifinished arrangement 34 is shown rolled up in its circumferential area in FIG. 8, whereby in the edge area of the semifinished arrangement 34 a surplus of mat or woven fabric can be picked up. This surplus may be cut off following insertion of the semifinished arrangement 34 into the receiving device 32 or left in place to reinforce the pressure bulkhead 10 to be manufactured in its edge region, meaning an attachment area, in which the pressure bulkhead 10 is connected to the aircraft fuselage 6. Further reinforcements in the form of material thickenings may also be provided at other points of the semifinished arrangement 34. In this case these points are preferably points that are particularly loaded or stressed in operation of the pressure bulkhead 10. For example, reinforcements may be introduced along load paths.

The device 30 also has a pressurization device 41 for applying a pressure to the tool cavity 38. Furthermore, the receiving device 32 of the tool 31 is provided with a surface structure with a plurality of receptacles 40, which is configured to act upon the semifinished arrangement 34 in such a way when a pressure is applied to the tool cavity 38 that the semifinished arrangement 34 is provided with a surface structure with a plurality of receptacles corresponding to the surface structure of the receiving device 32. The receptacles produced in the surface of the semifinished arrangement 34 are configured to receive a core element 16 each, as described above in connection with the pressure bulkhead 10 shown in FIGS. 2 to 4.

In FIG. 9 the device 30 is shown in its closed position, in which the semifinished arrangement 34 is received in the tool cavity 38 of the device 30. In the device 30 closed to be pressure-tight, the tool cavity 38 and thus the semifinished arrangement 34 received in the tool cavity 38 is now applied with a pressure of approx. 10 bar by means of the pressurization device 41, which is connected to the tool cavity 38 via a pressurization connection 42. The semifinished arrangement 34 is thereby pressed against the receiving device 32, due to which a surface structure corresponding to the surface structure of the receiving device 32 is embossed into the semifinished arrangement 34.

If desired, further fiber layers may now be introduced into the tool cavity 38 and the receiving device 32 and laid onto the already preformed semifinished arrangement 34. Then the tool cavity 38 may be pressurized afresh and the additional fiber layer also brought into the desired form thereby. This process may be repeated until the semifinished arrangement 34 received in the receiving device 32 has a desired thickness.

Then the device 30 is opened once more, in order to place the core elements 16 into the receptacles impressed into the semifinished arrangement 34 and to cover these with a plurality of further semifinished arrangements 35. The further semifinished arrangements 35 are suitable for manufacturing the second area elements 22 of the pressure bulkhead 10 and contain carbon fibers in the form of a fiber mat or woven fabric. The further semifinished arrangements 35 are thus arranged in such a position in the receiving device 32 that the core elements 16 are received in the receptacles of the semifinished arrangement 34 between surfaces facing one another of the semifinished arrangement 34 and of the further semifinished arrangements 35, and the surfaces facing one another of the semifinished arrangement 34 and the further semifinished arrangements 35 may be connected to one another in regions without core elements.

Now the device 30 is transferred to its closed position again and the tool cavity 38 as well as the semifinished core arrangement 34, 35, 16 taken up therein are heated by means of a heating device 43 to a temperature suitable for supplying a matrix material to the tool cavity 38 as well as for introducing the matrix material into the semifinished core arrangement. The heating device 43 is connected to the tool cavity 38 by a heat connection 44. When a desired temperature is present in the tool cavity 38 and the semifinished core arrangement 34, 35, 16, matrix material, for example an epoxy resin in a liquid state, is supplied to the tool cavity 38 by a matrix material supply device 44 and is introduced into the semifinished core arrangement 34, 35, 16. The matrix material supply device 44 is coupled to the tool cavity 38 by a matrix material connection 46.

As described in document DE 10 2010 035 493 A1 and US 2013/234373 A1, the matrix material may be introduced into the semifinished core arrangement 34, 35, 16 at an excess pressure or negative pressure prevailing in the tool cavity 38. If an injection method is selected to introduce the matrix material into the semifinished core arrangement 34, 35, 16, the pressurization device 41 serves to provide a necessary excess pressure in the tool cavity 38. If, on the other hand, an infusion method is selected to introduce the matrix material into the semifinished core arrangement 34, 35, 16, a negative pressure must prevail in the tool cavity 38. The pressurization device 41 then applies the tool cavity 38 with a negative pressure instead of an excess pressure.

Since the fiber composite component to be manufactured in the device 30 should preferably be manufactured substantially free of residual stress or with reduced residual stress, the device 30 is preferably used for the manufacture of a composite fiber component by means of the "constant volume method" described in the document DE 10 2010 035 493 A1 and US 2013/234373 A1. For this the tool cavity 38 of the device 30 must be specially designed, namely for play-free receiving the semifinished core arrangement 34, 35, 16 as well as advantageously additionally of flow media as well as a film arrangement surrounding the semifinished core arrangement 34, 35, 16 and the flow media.

When the semifinished core arrangement 34, 35, 16 is impregnated in the tool cavity 38 by the introduced matrix material, the matrix material must still cure. The curing process may be accelerated by increasing the temperature in the tool cavity 38 by means of the heating device 43. The tool cavity 38 is advantageously put under a pressure of 3 bar, for example, to cure the matrix material. Following curing of the matrix material, the fiber composite component may be cooled to room temperature and removed from the device 30.

As described in document DE 10 2010 035 493 A1 and US 2013/234373 A1, any temperature increase and/or temperature decrease during the component manufacture, for example when heating the semifinished core arrangement 34, 35 16 before introduction of the matrix material, when curing the matrix material or when cooling the finished fiber composite component to room temperature, takes place in increments and not continuously, in order to avoid material-stressing jumps between temperature gradients and compressive stress gradients in transition regions between the individual components of the fiber composite component, which following its manufacture has a high-quality integral construction. The incremental temperature increase or decrease is designated a "zigzag or zz curve" and the entire process is called "zigzag method." Its combination with the previously described "constant volume method" is termed "zigzag-CV method."

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A pressure bulkhead made of fiber composite material for an aircraft fuselage for the pressure-tight axial closure of a fuselage region configured to be put under internal pressure, the pressure bulkhead comprising:
- a first area element formed from a single sheet having a plurality of receptacles formed therein;
- at least one second area element; and
- a plurality of core elements, wherein one of said plurality of core elements is received in each of the receptacles of the first area element between surfaces facing one another of the first area element and of the at least one second area element and wherein the surfaces facing one another of the first area element and of the at least one second area element are connected to one another in regions without core elements adjacent to the receptacles.

2. The pressure bulkhead according to claim 1, wherein the first area element is formed substantially calotte-shaped.

3. The pressure bulkhead according to claim 2, wherein the receptacles of the first area element protrude from at least one of a concave and a convex side of the calotte shape.

4. The pressure bulkhead according to claim 1, wherein the core elements are formed from a foam material.

* * * * *